United States Patent
Johansson et al.

(10) Patent No.: US 9,430,033 B1
(45) Date of Patent: *Aug. 30, 2016

(54) SYSTEM WAKEUP BASED ON CHANGES IN PHYSICAL ENVIRONMENT

(71) Applicant: GOOGLE INC., Mountain View, CA (US)

(72) Inventors: Olof Johansson, Belmont, CA (US); Mandeep Baines, Cupertino, CA (US); Benson Leung, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,006

(22) Filed: Sep. 16, 2015

Related U.S. Application Data

(63) Continuation of application No. 13/550,846, filed on Jul. 17, 2012, now Pat. No. 9,152,204.

(51) Int. Cl.
| | |
|---|---|
| *G06F 1/26* | (2006.01) |
| *G06F 1/32* | (2006.01) |
| *G06F 3/12* | (2006.01) |
| *H02M 1/00* | (2006.01) |

(52) U.S. Cl.
CPC ............ *G06F 1/3296* (2013.01); *G06F 1/3231* (2013.01); *G06F 1/266* (2013.01); *G06F 1/3203* (2013.01); *G06F 3/1221* (2013.01); *H02M 2001/0032* (2013.01); *Y02B 60/186* (2013.01)

(58) Field of Classification Search
CPC .. G06F 1/3203; G06F 1/3209; G06F 1/3287; G06F 9/4418; H02M 2001/0032; Y02B 60/186
USPC ........................................ 713/300, 320, 323
See application file for complete search history.

(56) References Cited

U.S. PATENT DOCUMENTS

| | | | |
|---|---|---|---|
| 9,152,204 B2* | 10/2015 | Johansson | ............. G06F 1/3206 |
| 2007/0016814 A1 | 1/2007 | Rusu et al. | |
| 2008/0028243 A1 | 1/2008 | Morisawa | |
| 2010/0235667 A1 | 9/2010 | Mucignat et al. | |
| 2012/0287035 A1 | 11/2012 | Valko et al. | |
| 2015/0220131 A1 | 8/2015 | Johansson et al. | |

OTHER PUBLICATIONS

Non-Final Office Action Received for U.S. Appl. No. 13/550,846, mailed on Sep. 12, 2014, 16 pages.
Response to Non-Final Office Action for U.S. Appl. No. 13/550,846, filed on Dec. 12, 2014, 13 pages.
Non-Final Office Action Received for U.S. Appl. No. 13/550,846, mailed on Feb. 20, 2015, 15 pages.
Response to Non-Final Office Action for U.S. Appl. No. 13/550,846, filed on May 14, 2015, 14 pages.
Notice of Allowance Received for U.S. Appl. No. 13/550,846, mailed on Jun. 2, 2015, 5 pages.

* cited by examiner

*Primary Examiner* — Michael J Brown
(74) *Attorney, Agent, or Firm* — Brake Hughes Bellermann LLP

(57) ABSTRACT

Methods for controlling power states in a computing device, and apparatus for performing such methods are disclosed. An example method includes monitoring a plurality of sensors included in a computing device. The method further includes detecting, based on the monitoring, occurrence of at least one of a change in physical orientation of the computing device and one or more changes in an ambient environment of the computing device and, responsive to a detected change, activating a controller of the computing device. The method also includes providing, from the sensors to the controller, data corresponding with the at least one of the detected changes. The method still further includes selecting, by the controller, based on the data provided by the sensors, a power state for the computing device and transitioning the computing device to the selected power state.

20 Claims, 6 Drawing Sheets

SYSTEM WAKEUP BASED ON CHANGES IN PHYSICAL ENVIRONMENT

CROSS-REFERENCE TO RELATED APPLICATIONS

This application is a continuation of and claims priority under 35 U.S.C. §120 to U.S. application Ser. No. 13/550,846, filed on Jul. 17, 2012, and entitled "SYSTEM WAKEUP BASED ON CHANGES IN PHYSICAL ENVIRONMENT", the contents of which are hereby incorporated by reference.

TECHNICAL FIELD

This document relates, generally, to changing power states of a computing system in response to changes in physical environment.

BACKGROUND

Computing devices, such as desktop computers, laptop computers, tablet computers, netbook computers, or other such devices, often implement a number of power management techniques in order to reduce the amount of power consumed by those devices, so as to prolong battery life between charges and/or to reduce the total amount of power consumed by a given device. In some approaches, such techniques may be used only when the device is operating on battery power, or, in other approaches, may be used regardless of the power source being used (e.g., battery or AC power). Common power management techniques include performing a screen dimming operation for a display panel of a computing device, turning off the display and/or performing a system suspend or hibernation operation, where current operating state information for a computing device is saved, respectively, to random access memory (RAM) or to disk (e.g., a hard drive, or a solid-state/flash drive), and the computing device is then placed in a very low power operating state.

Such power management techniques may be performed by a computing device when the computing device detects that it has not received any user input (e.g., keyboard or pointing device input) in a specific period of time and has not been explicitly instructed by an interface of an application running on the system (or other component of the system) to not perform power management activities. For example, a computing device may first dim a computing device's screen after a period of time, and then, sometime later, turn off the screen, and then, sometime even later, perform a system suspend operation or hibernation operation, such as those described above, and remain in the suspend state or hibernation state until the user deliberately interacts with the computing device to indicate the user wishes to use the device by, for example, opening a display panel lid, entering a keystroke, using the pointing device or engaging a power switch. Such approaches, however, detract from a user's experience as the user that wants to use the computing device must wait for the computing device to resume from hibernation or suspend before the system is ready for use.

SUMMARY

In a general aspect, a computer-implemented method includes monitoring, by a computing device operating in a hibernation power state, a plurality of sensors included in the computing device. The method further includes detecting, based on the monitoring, occurrence of at least one of a change in physical orientation of the computing device and one or more changes in an ambient environment of the computing device. The method also includes, in response to the detecting, activating a controller of the computing device. The method still further includes providing, from the plurality of sensors to the controller, data corresponding with the at least one of the change in physical orientation of the computing device and the one or more changes in the ambient environment of the computing device. The method yet further includes, selecting, by the controller, based on the data provided by the sensors, a power state for the computing device, wherein the power state is selected from the hibernation power state, a suspended power state and an active power state, and transitioning the computing device to the selected power state.

Implementations may include one or more of the following features. For example, selecting the power state for the computing device may include selecting the hibernation power state and transitioning the computing device to the selected power state may include deactivating the controller.

Selecting the power state for the computing device may include selecting the suspended power state. Transitioning the computing device to the selected power state may include activating non-volatile memory and volatile memory of the computing device and copying previously saved operating state information for the computing device from the non-volatile memory to the volatile memory.

Selecting the power state for the computing device may include selecting the active power state. Transitioning the computing device to the selected power state may include activating non-volatile memory and volatile memory of the computing device, copying previously saved operating state information for the computing device from the non-volatile memory to the volatile memory, and activating at least one of a main processor of the computing device, a display of the computing device, an audio system of the computing device and one or more user input devices of the computing device.

The plurality of sensors may include at least two of a gyrometer, an accelerometer, a light sensor, a temperature sensor and a location sensor. The location sensor may include at least one of a global positioning system sensor, a WiFi location sensor and a cellular communication location sensor.

Detecting the change in physical orientation of the computing device may include detecting one of a change of orientation of the computing device from a vertical orientation to a horizontal orientation, or a change of orientation of the computing device from the horizontal orientation to the vertical orientation.

Detecting one or more changes in the ambient environment of the computing device may include detecting one or more of a change in ambient light, a change in ambient temperature, change in vibrations occurring in the ambient environment and a change in geographic location of the computing device. The change in geographic location may be determined based on a first location that is determined prior to the computing device entering the hibernation power state and a second location that is determined in response to the controller being activated.

Selecting the power state for the computing device may be based on one or more of a time of day, a calendar date, user provided information, usage history of the computing device and remaining battery capacity of a battery of the computing device.

In the event the controller selects one of the suspended power state and the active power state and a user does not interact with the computing device using at least one user input device within a predetermined time period after the selection, the method may include: incrementing a count value; in the event the count value exceeds a threshold value, disabling the plurality of sensors; and transitioning the computing device to the hibernation power state.

The method may further include, in the event the controller selects one of the suspended power state and the active power state and the user interacts with the computing device using the at least one user input device within the predetermined time period after the selection: clearing the count value; in the event the active power state was selected, remaining in the active power state; and, in the event the suspended power state was selected, transitioning the computing device to the active power state.

In another general aspect, a computing device includes a plurality of sensors configured to detect, while the computing device is operating in a hibernation power state, occurrence of at least one of a change in physical orientation of the computing device and one or more changes in an ambient environment of the computing device. The computing device further includes a controller that is operably coupled with the plurality of sensors. The controller is configured to become active in response to the detecting; receive, from the plurality of sensors, data corresponding with the at least one of the change in physical orientation of the computing device and the one or more changes in the ambient environment of the computing device; select, based on the data provided by the sensors, a power state for the computing device, wherein the power state is selected from the hibernation power state, a suspended power state and an active power state; and initiate transition of the computing device to the selected power state.

Implementations may include one or more of the following features. For example, the plurality of sensors may include a gyrometer. The gyrometer may be configured, in conjunction with the controller, to detect one of a change in physical orientation of the computing device from a vertical orientation to a horizontal orientation, or a change of physical orientation of the computing device from the horizontal orientation to the vertical orientation.

The plurality of sensors may include a light sensor. The light sensor may be configured to detect, in conjunction with the controller, a change in light intensity in the ambient environment of the computing device. Detecting the change in light intensity may include determining a rate of change in light intensity.

The plurality of sensors may include a temperature sensor. The temperature sensor may be configured to detect, in conjunction with the controller, a change in temperature in the ambient environment of the computing device. Detecting the change in temperature may include determining a rate of change in temperature.

The plurality of sensors may include an accelerometer. The accelerometer may be configured to detect, in conjunction with the controller, vibrations occurring in the ambient environment of the computing device. Detecting vibrations may include detecting vibration patterns.

The plurality of sensors may include a location sensor. The location sensor may be configured to detect, in conjunction with the controller, a change in a geographic location of the computing device. The computing device may be configured to detect the change in geographic location in response to the controller being activated by another one of the plurality of sensors.

The controller may be an embedded controller. The controller may be configured to select the power state also based on one or more of a time of day, a calendar date, user provided information, usage history of the computing device and remaining battery capacity of a battery of the computing device.

In another general aspect, a computer-implemented method includes monitoring, by a computing device operating in a suspended power state, a plurality of sensors included in the computing device. The method further includes detecting, based on the monitoring, occurrence of at least one of a change in physical orientation of the computing device and one or more changes in an ambient environment of the computing device. The method also includes, in response to the detecting, providing, from the plurality of sensors to a controller of the computing device, data corresponding with the at least one of the change in physical orientation of the computing device and the one or more changes in the ambient environment of the computing device. The method still further includes selecting, by the controller, based on the data provided by the sensors, a power state for the computing device, wherein the power state is selected from a hibernation power state, the suspended power state and an active power state and transitioning the computing device to the selected power state.

Implementations may include one or more of the following features. For example, in the event the controller selects one of the suspended power state and the active power state and a user does not interact with the computing device using at least one user input device within a predetermined time period after the selection, the method may include incrementing a count value; in the event the count value exceeds a threshold value, disabling the plurality of sensors; and transitioning the computing device to the hibernation state power state.

In the event the controller selects one of the suspended power state and the active power state and the user interacts with the computing device using the at least one user input device within the predetermined time period after the selection, the method may include clearing the count value; in the event the active power state was selected, remaining in the active power state; and in the event the suspended power state was selected, transitioning the computing device to the active power state.

In another general aspect, a computing device includes a plurality of sensors configured to detect, while the computing device is operating in a suspended power state, occurrence of at least one of a change in physical orientation of the computing device and one or more changes in an ambient environment of the computing device. The computing device also includes a controller that is operably coupled with the plurality of sensors. The controller is configured to receive, from the plurality of sensors, data corresponding with the at least one of the change in physical orientation of the computing device and the one or more changes in the ambient environment of the computing device. The controller is further configured to select, based on the data provided by the sensors, a power state for the computing device, where the power state is selected from a hibernation power state, the suspended power state and an active power state. The controller is further configured to initiate transition of the computing device to the selected power state.

In an implementation, the plurality of sensors may include at least two of a gyrometer, an accelerometer, a light sensor, a temperature sensor and a location sensor.

DETAILED DESCRIPTION

Figure 1:
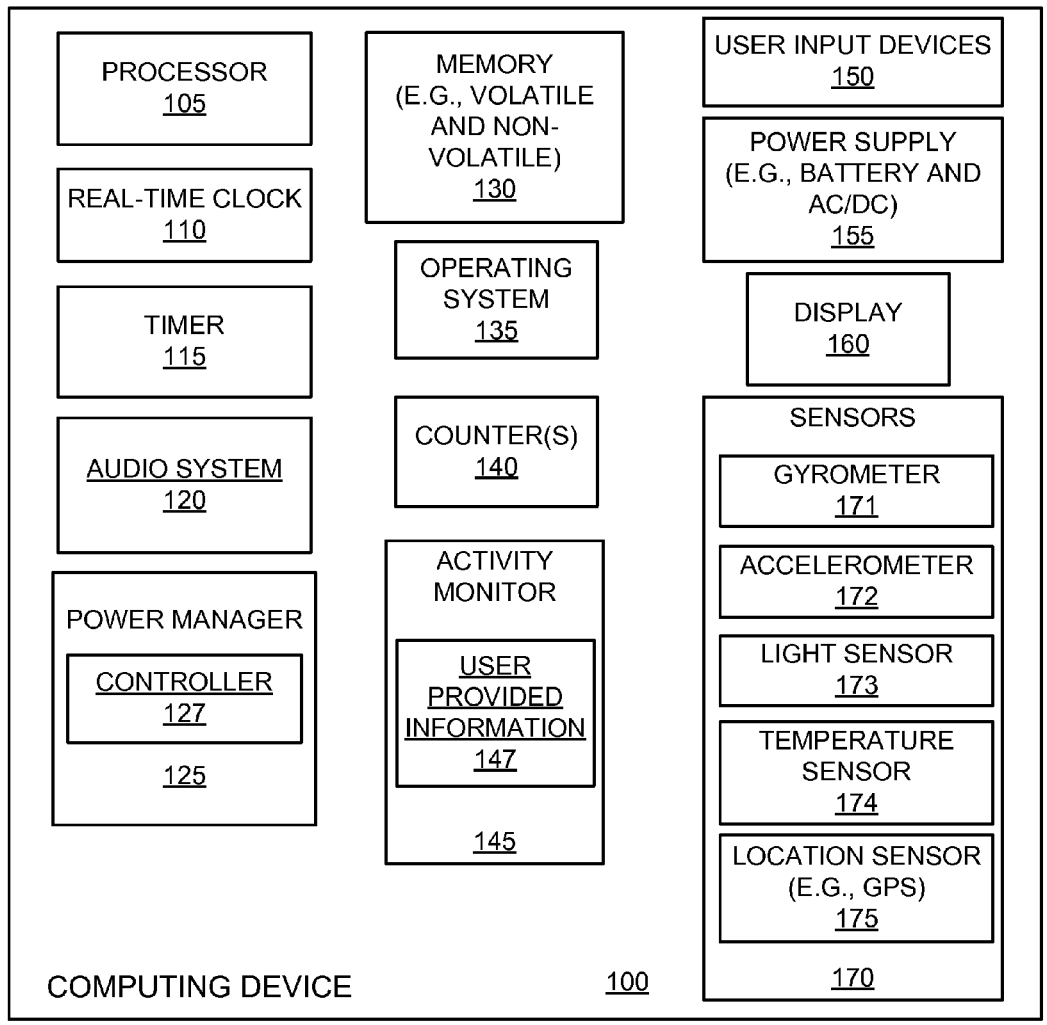
FIG. 1 is a block diagram illustrating a computing device in accordance with an example embodiment.

FIG. 1 is a block diagram of a computing device 100 in accordance with an example embodiment. Depending on the particular embodiment, the computing device 100 may take the form of a desktop computer, a laptop computer, a tablet computer, a netbook computer, or other such device. As illustrated in FIG. 1, the computing device 100 includes a number of modules, components and/or devices. It will be appreciated that the specific elements illustrated in FIG. 1 are shown for illustrative purposes and by way of example. In other embodiments, a computing device may include fewer elements, additional elements or may substitute certain elements with other elements. Also, the various elements of the computing device 100 may be operationally coupled with one another in a number of appropriate manners. For instance, a processor 105 of the computing device 100 may be operationally coupled with one or more of the other elements of the computing device 100 using a bus, or multiple busses.

As shown in FIG. 1, the computing device 100 includes the processor 105, a real-time clock (RTC) 110, a timer 115, an audio system 120, a power manager 125, memory 130, an operating system 135, counter(s) 140, an activity monitor module 145, user input devices 150, a power supply 155, a display device 160 and sensors 170. In some embodiments, two or more of these elements may be combined into a single element. For example, the power manager 125, or portions of the power manager 125, may be implemented as part of the operating system 135. In other embodiments, the power manager 125 may be implemented in firmware of the computing device 100. In certain embodiments, the functions of the power manager 125, such as describe herein, may be implemented in other fashions by one or more elements of the computing device 100.

In other embodiments, a single element of the computing device 100 may be implemented as multiple elements, or may include multiple sub-elements. For instance, the memory 130 may be implemented as separate volatile (e.g., random-access memory) and non-volatile memory (e.g., a hard disk drive and/or a flash memory drive) elements. In other embodiments, volatile and non-volatile memory may be implemented as sub-elements of the memory 130. As another example, the user input devices 150 may include multiple input devices, such a keyboard and a pointing device. It will be appreciated that the particular arrangement of elements of a computing device, such as the computing device 100, will depend, at least in part, on the specific embodiment.

The computing device 100 may be configured to operate and/or implement a number of different power states. Such power states may include one or more active power states, a suspend-to-RAM power state (e.g., a suspended power state), a suspend-to-disk power state (e.g., a hibernation power state) and/or a powered-off power state.

The active power states in the computing device 100 may include a display-on active state and a display-off active state. In the display-on active state, the display device 160 of the computing device 100 is active (powered on) and may be used to render visual content generated by the computing device 100. Such visual content may include user application interfaces, video content being played by the computing device 100, among a number of other types of visual content.

In the display-off active state, the display device 160 is powered off. In the display-off active state, the components of the computing device 100, other than the display device 160, may operate with substantially equivalent levels of functionality as in the display-on active state. Because computing device displays, such as the device display 160, may consume a substantial amount of power when active, operating the computing device 100 in the display-off power state (e.g., while waiting for a user to interact with the computing device 100) may consume significantly less power than operating in the display-on active state.

The suspend-to-RAM power state of the computing device 100 may be referred to as "Standby," "Sleep," or "Suspend," depending on the particular embodiment. In such a power state, aside from powering the random access memory ("RAM") to retain information regarding the computing device's 100 operating state, the computing device 100 attempts to reduce or cut power to all unneeded parts of the machine (e.g., the hard disk(s) stop spinning, the display device is placed into a dark or low power state, and peripheral devices are de-powered). Such a power state often may be referred to as Standby (for computing devices running a Microsoft Windows 95—Server 2003 operating system), or is called Sleep (for computing devices running an Apple operating system or a Windows Vista, Windows 7, Windows Server 2008 operating system), or Suspend (for computing devices running a Linux operating system). For purposes of this disclosure, the suspend-to-RAM power state is referred to as a "suspended power state." In such a state, the processing functions of the computing device 100 are powered down, and some small amount of power is used to preserve the contents of RAM and to support waking up the computing device from the suspended power state into an active power state. When the computing device 100 is placed into the suspended power state, it may typically consumes less than about 20% of the total power than is consumed when the computing device 100 is operating in an active power state. In the computing device 100, the sensors 170 may also remain active in the suspended power state, where the computing device 100 may decide, based on events detected by the sensors 170, to change a power state of the computing device 100 in accordance with the techniques described herein.

The suspend-to-disk power state of the computing device 100 may be referred to as "Hibernate," or "Safe Sleep" or "suspend-to-disk," depending on the particular embodiment. In such a power state, the contents of the computing device's 100 RAM may be written to non-volatile storage such as a hard disk, as a file, or on a separate partition, before placing the computing device 100 in such a low power state. When the computing device 100 is restarted or resumed, it reloads the data that was previously written to the non-volatile memory and is, thus, restored to the state it was in when the low power state was invoked. To enable use of such a power state, the hard disk (or other non-volatile memory) must have sufficient free space to store all non-replaceable contents of RAM. Such a low power state may be referred to as Hibernate (for computing devices running a Microsoft Windows 95—Server 2003, a Microsoft Vista operating system or a Windows 7 operating system), Safe Sleep (for computing devices running an Apple operating system), or suspend-to-disk (for computing devices running a Linux operating system). For purposes of this disclosure, the suspend-to-disk power state is referred to as a "hibernation power state." When the computing device 100 is placed into the hibernation power state, it may consume about as much power as is consumed when the computing device 100 is powered off. In like fashion as discussed above with respect to the suspended power state, the sensors 170 of the computing device 100 may remain active in the hibernation power state, where the computing device 100 may decide, based on events detected by the sensors 170, to change a power state of the computing device 100.

In the computing device 100, the power manager 125 may be configured to manage the process of transitioning the computing device 100 from one power state to another. For example, the power manager 125 may include a controller 127, such as an embedded controller, that is configured to signal one or more elements of the computing device 100 to initiate or cause a desired change in power state (e.g., based on signals and/or data from other elements of the computing device 100, such as the sensors 170). The power manager 125 may be further configured to monitor the various elements of the computing device 100 to ensure that they complete any operations or functions associated with a transition between power states of the computing device 100. For example, if the computing device 100 is transitioning from an active power state to a suspended power state, a hibernation power state, or an off state, the power manager 125 may monitor the various elements of the computing device 100 to ensure that any housekeeping operations (e.g., saving operating state information for use when returning the computing device 100 to an active power state) are completed before allowing the computing device 100 to enter the suspended power state, the hibernation power state or the off state.

As indicated above, in the computing device 100, the sensors 170 may be configured to detect the occurrence of certain events, such as changes in physical orientation of the computing device 100 and/or changes in an ambient environment of the computing device 100. As described herein, in response to detecting such events, the sensors 170 may be configured to provide information to the controller 127 (or the processor 105) about one or more detected events. In the computing device 100, the power manager 125 (e.g., using the controller 127) may be configured, based on the information provided by the sensors 170, to select a power state for the computing device 100 and initiate a transition of the computing device 100 to the selected power state, such as in the manners described herein.

As shown in FIG. 1, the sensors 170 of the computing device 100 may include a gyrometer 171, an accelerometer 172, a light sensor 173, a temperature sensor 174 and a location sensor 175, such as a global positioning system (GPS) sensor. In other implementations, other sensors and/or types of sensors may be used. For instance, in one implementation, the location sensor 175 may operate based on WiFi or cellular communication signals (e.g., using triangulation or other approaches). Such approaches for determining location may be used in addition to, or in place of a GPS sensor. In still other implementations, other types of sensors may be included in the sensors 170, while in yet other implementations, one or more of the sensors 170 shown in FIG. 1 may be eliminated.

As described herein, the sensors 170 may be configured to detect the occurrence of various events and provide information regarding such events to the power manager 125. For example, the gyrometer 171 may be configured to detect changes in physical orientation of the computing device 100, e.g., between a vertical orientation and a horizontal orientation. The accelerometer 172 may be configured to detect changes in vibrations, or patterns of vibrations occurring in an ambient environment of the computing device 100, such as may be caused by footsteps of a person or persons walking in the vicinity of the computing device 100 or movement of the computing device 100. The light sensor 173 may be configured to detect changes in light intensity in the ambient environment of the computing device 100, such as may result from lights being turned on or off, or by removing the computing device 100 from, or placing the computing device 100 in a carrying case. In an example embodiment, the light sensor 173 may be configured to detect a rate of change in light intensity and only provide information to the controller 127 (power manager 125) regarding changes in light intensity above a threshold rate of change. The temperature sensor 174 may be configured to detect changes in temperature in the ambient environment of the computing device 100, such as may be caused by a climate control system being turned on or off, or as a result of removing the computing device 100 from a carrying case, as some examples. In an example embodiment, the temperature sensor 174 may be configured to detect a rate of change in temperature and only provide information to the controller 127 (power manager 125) regarding changes in temperature above a threshold rate of change. The location sensor 175 may be configured to detect changes in a physical location of the computing device 100, such as may occur if a user is traveling with the computing device 100.

Depending on the particular situation, information about detected events may be provided from each of the sensors to the power manager 125 while the computing device 100 is in a low power, when the computing device 100 is in an active power state, and/or when the computing device 100 is transitioning between power states. For example, in one approach, the gyrometer 171, the accelerometer 172, the light sensor 173 and the temperature sensor 174 may provide information to the power manager 125 regardless of the power state of the computing device 100, while the location sensor 175 may only provide location information to the power manager when the computing device 100 is transitioning between power states. In other approaches, a location of the computing device 100 may be determined by the location sensor 175 in response to the controller 127 being activated (e.g., by an event detected by one of the other sensors 170). Information regarding events detected by the sensors 170 that is provided to the power manager 125 may be used by the power manager 125 to generate a heuristic-based usage pattern for the computing device 100. That usage pattern may then be used to improve power management for the computing device 100, as well as to enhance a user's experience when using the computing device 100, such as by using the techniques described herein.

Based on information provided by the sensors 170 regarding such events, the power manager 125 may select a power state for the computing device 100 and then initiate, or cause the computing device 100 to transition to the selected power state. Such approaches may improve a user's experience when using the computing device 100, as the computing device 100 may change power states (e.g., a hibernation power state to a suspended or active power state) in response to events detected by the sensors 170. Using such approaches may reduce, or eliminate the amount of time a user has to wait before being able to begin using the computing device 100, as compared to approaches where a user first interacts with computer (e.g., using an input device) to initiate such power state transitions. Depending on the particular embodiment, information regarding events detected by the sensors 170 may be used alone, or in combination with each other to select a power state for the computing device 100.

In certain embodiments, the power manager 125 of the computing device 100 may also use information received from the sensors 170 in combination with other information when selecting power states for the computing device 100. For instance, information from the sensors 170 may be used in combination, for example, with usage pattern information that is included in the activity monitor 145. In such an approach, the activity monitor 145 may be configured to monitor usage patterns of the computing device 100 (e.g., times when the computing device 100 is typically used) and keep track of such patterns. In other approaches, the power manager may also use an amount of remaining battery capacity when selecting a power state. For instance, the power manager 125 may only select an active power state if the remaining batter capacity is above a threshold value.

As shown in FIG. 1, the activity monitor 145 may also include user provided information 147. In an example approach, the user provided information 147 may include, as some examples, out-of-office notices and calendar information (e.g., scheduled events, such as meetings, vacations, or otherwise). As another example, information from the real-time clock 110 (e.g., day of week, time of day) may be used in combination with information from the sensors 170 and/or usage pattern information included in the activity monitor 145 when selecting power states for the computing device 100.

As an example of an event that may be detected by the sensors 170, the accelerometer 172 may detect vibrations (or a change in vibrations or vibration patterns) occurring in an ambient environment of the computing device 100, which may indicate footsteps in the vicinity of the computing device 100, such as those of a user approaching the computing device 100. The accelerometer 172 may then provide that information to the power manager 125. As part of selecting a power state for the computing device 100, the power manager 125 may obtain information from the activity monitor 145 and/or the RTC 110. If information included in the activity monitor 145 (e.g., usage patterns and/or user provided information 147) and/or information from the RTC 110 (e.g., day of week and time of day) indicates that it is likely a user may want to use the computing device 100, the power manager 125 may initiate a transition of the computing device from a hibernation power state (or a suspended power state) to an active power state. However, if information included in the activity monitor 145 and/or information from the RTC 110 indicates that it is unlikely a user wants to use the computing device 100 (e.g., the user has entered an out-of-office notice), the power manager 125 may select the hibernation power state or the suspended power state in response to the information from the accelerometer 172.

In certain embodiments, the power manager 125 may be configured to operate in conjunction with the timer 115 (as well as using other information) when selecting power states for the computing device 110. As an example, the sensors 170 may detect one or more events and provide information regarding those events to the power manager 125. For instance, the light sensor 173 may detect a sudden change in light intensity in an ambient environment of the computing device 100 (e.g., such as office lights being turned on) and provide information to the power manager 125 regarding the change. The power manager 125 may then determine, based on usage patterns included in the activity monitor 145 and day and time information from the RTC 110, that a user typically uses the computing device 100 thirty minutes after such an event occurring at a particular day and time. As a result of this determination, the power manager 125 may set the timer 115 to initiate a transition of the computing device 100 to an active power state twenty-five minutes after detection of the detected change in light intensity. Such an approach allows the user to begin using the computer after the transition is complete, without having to first interact with the computer to initiate the power state transition. In other instances, other events detected by the sensors 170 may be handled in a similar fashion.

In certain embodiments the counter(s) 140 may be used to keep track of "false positive" power state selections. A "false positive" may refer to instances where the power manager 125, in response to events detected by the sensors 170, selects either the suspended power state or the active power state in anticipation of a user interacting with the computing device 110 and such user interaction does not occur within a specific period of time. In such false positive situations, the power manager 125 (e.g., using controller 127) may increment a count value of a respective counter in the counter(s) 140. If the number of consecutive false positives (e.g., the count value) exceeds a threshold amount, the power manager may be configured to disable the sensors 170 and transition the computing device to the hibernation power state. In such a situation, a user may need to interact with the computing device 100 (e.g., by using a user input device or pressing a power button) in order to transition the computing device 100 to an active power state.

Depending on the particular embodiment, the counter(s) 140 may comprise a single counter that tracks each occurrence of a false positive, or may include multiple counters that track, respectively, false positives associated with a specific event (or groups of events) detected by the sensors 170. In such approaches, the false positive count, or counts, may be cleared when user interaction does occur within the specific (e.g., predetermined) period of time. In the computing device 100, information regarding false positives may be collected by the activity monitor 145 and used to reduce the number of false positives that occur, such as by modifying usage pattern information included in the activity monitor 145.

Figure 2:
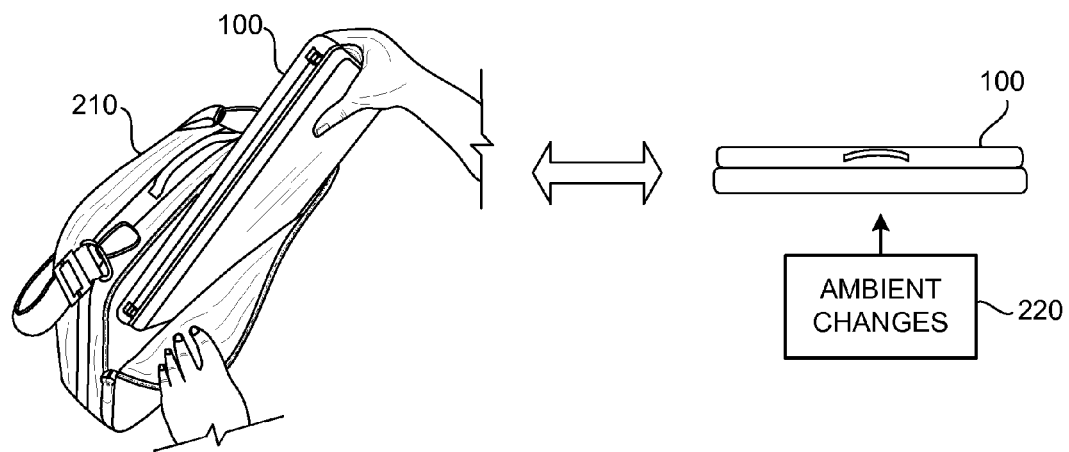
FIG. 2 is a diagram illustrating changes in physical orientation and an ambient environment of a computing device in accordance with an example embodiment.

FIG. 2 is a diagram illustrating changes in physical orientation of a computing device, such as the computing device 100, and changes in an ambient environment 220 of the computing device 100 that may be used when selecting a power state for the computing device 100 in accordance with an example embodiment. While the computing device 100 is shown in FIG. 2, it will be appreciated that other computing devices having other configurations may be used to implement the techniques described herein. However, for purpose of illustration, the diagram shown in FIG. 2 will be described with further reference to the computing device 100 as illustrated in FIG. 1.

The diagram of FIG. 2 illustrates example events that may be detected by the sensors 170 of the computing device 100. For instance, as is shown on the left side of FIG. 2, the computing device 100 may be removed from a computer carrying case 210, where the computing device 100 is stored in a vertical orientation. After removing the computing device 100 from the carrying case 210, the computing device 100, as is shown on the right side of FIG. 2, may be placed in horizontal orientation, such as on a table or other work surface. As a result of removing the computing device 100 from the carrying case 210 and placing it on the work surface, the gyrometer 171 of the sensors 170 may detect a change from the computing device 100 being in a vertical orientation (in the carrying case 210) to the computing device 100 being in a horizontal orientation (on the work surface). In response to detecting this change in physical orientation of the computing device 100, the gyrometer 171 may provide information to the controller 127 (power manager 125) regarding the detected change.

As is also shown in FIG. 2, as a result of removing the computing device 100 from the carrying case 210 and placing it on the work surface, the computing device 100 may experience ambient environment changes 220, which may also be detected by the sensors 170. For instance, the light sensor 173 may detect a resulting change in ambient light and the temperature sensor 174 may detect a resulting change in ambient temperature. Additionally, the accelerometer 172 may detect vibrations and the location sensor 175 may detect a change in physical location of the computing device 100 (e.g., as compared to a physical location where the computing device 100 was placed in the carrying case 210). The sensors 170 may, in addition to the information corresponding with the change in physical orientation detected by the gyrometer 171, provide information to the controller 127 (power manager 125) regarding the ambient changes 220 detected by the sensors 170.

While the foregoing describes events that may be detected by the sensors 170 as a result of removing the computing device 100 from the carrying case 210 and placing it on a work surface, it will be appreciated that the sensors 170 would also detect events associated with removing the computing device 100 from the work surface and placing it in the carrying case 210. For instance, the gyrometer 171 may detect a change from a horizontal orientation of the computing device 100 to vertical orientation. Additionally, the accelerometer 172, the light sensor 173 and the temperature sensor 174 may also detect events that correspond with removing the computing device 100 from the work surface and placing it in the carrying case 210.

After receiving information from the sensors 170 associated with removing the computing device 100 from the carrying case 210, or placing it in the carrying case 210, as shown in FIG. 2, the controller 127 (power manager 125) may be configured to use the information from the sensors 170 (e.g., alone or in combination with other information, such as described herein) to select a power state for the computing device 100 and initiate a transition of the computing device to the selected power state.

For instance, if the computing device 100 is operating in a hibernation power state while in the carrying case 210, the events detected by the sensors 170 as a result of removing the computing device 100 from the carrying case 210 and placing it on the work surface may cause the controller 127 to select an active power state and initiate a transition of the computing device 100 to the active power state. Alternatively, if the computing device 100 is operating in a suspended power state while on the work surface, the events detected by the sensors 170 as a result of removing the computing device 100 from the work surface and placing it in the carrying case 210 may cause the controller 127 to select a hibernation power state for the computing device 100 and initiate a transition of the computing device 100 to the hibernation power state.

The approaches described above with respect to FIG. 2 are given by way of example. It will be appreciated that the sensors 170 may be configured to detect other events that may occur in a number of situations, such as those described herein. It will also be appreciated that information regarding events detected by the sensors 170 may be used in combination with other information when selecting power states for the computing device 100, such as usage patterns for the computing device 100, user provided information 147 and/or information from the RTC 110, such as in the manners described herein.

Figure 3:
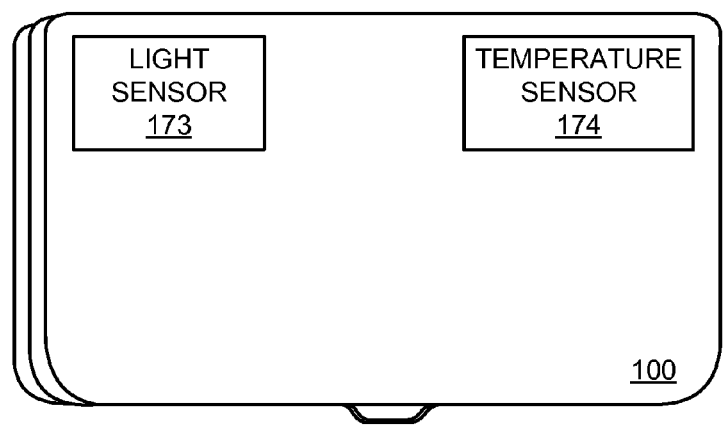
FIG. 3 is a diagram illustrating a computing device in accordance with an example embodiment.

FIG. 3 is a diagram illustrating a top down view of the computing device 100 in accordance with an example embodiment. As shown in FIG. 3, the computing device 100 may be implemented with the light sensor 173 and the temperature sensor 174 disposed on, or integrated with an exterior surface of the computing device 100. Such an approach may allow the light sensor 173 and the temperature sensor 174 to accurately detect changes in ambient light intensity and ambient temperature for an ambient environment of the computing device 100. In example embodiments, the gyrometer 171, the accelerometer 172 and the location sensor 175 shown in FIG. 1 may be implemented within a housing of the computing device 100.

Figure 4:
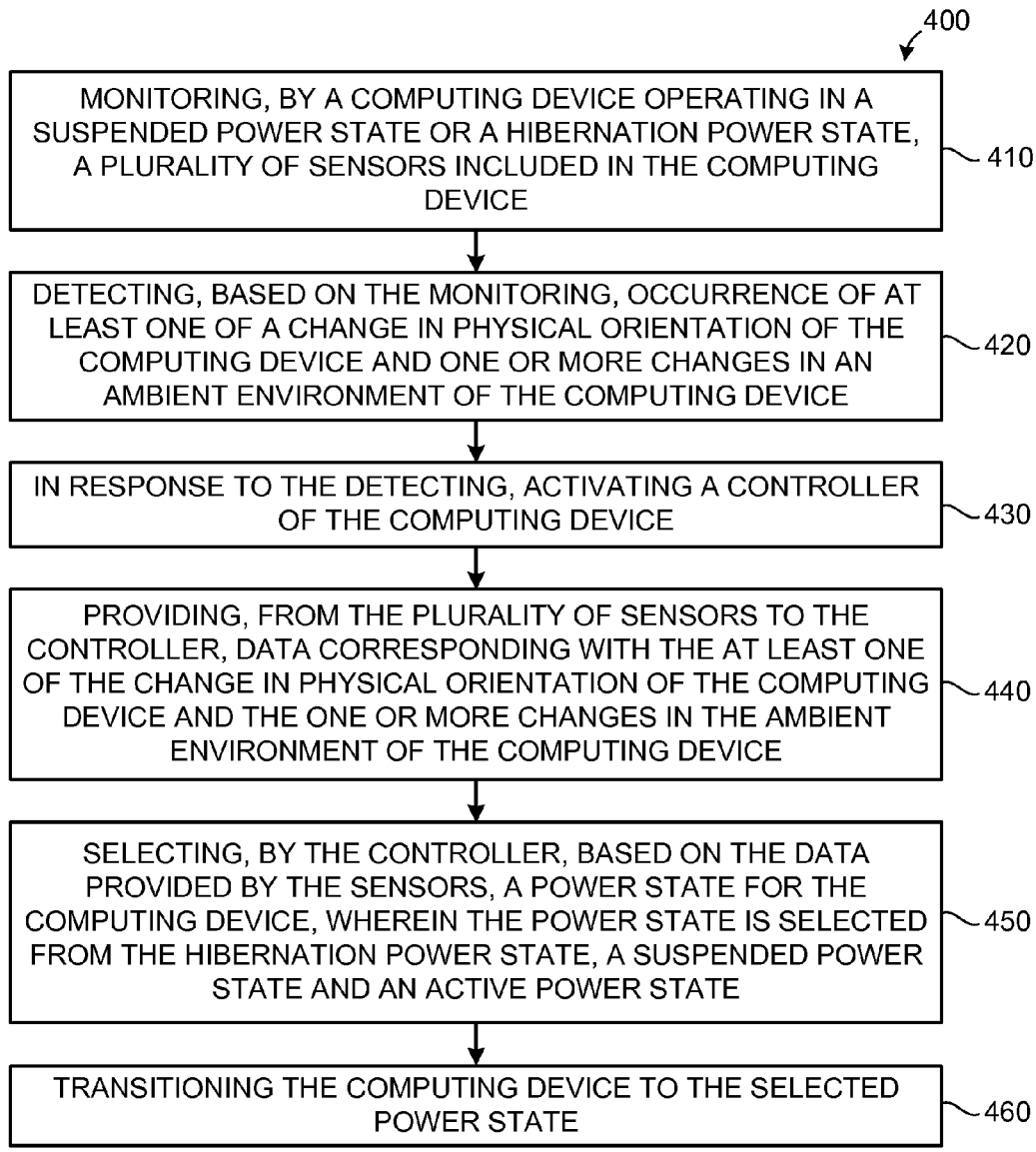
FIG. 4 is a flowchart illustrating method for changing a power state of a computing device in accordance with an example embodiment.

FIG. 4 is a flowchart illustrating method 400 for changing a power state of a computing device in accordance with an example embodiment. The method 400 may be implemented using the computing device 100 illustrated in FIG. 1. Accordingly, for purposes of illustration, the method 400 will be described with further reference to FIG. 1. It will be appreciated, however, that the method 400 may be implemented in computing devices having a number of other configurations.

The method 400, when implemented in the computing device 100 includes, at block 410, monitoring, by the computing device 100 when operating in a suspended power state or a hibernation power state, the plurality of sensors 170 included in the computing device 100. At block 420, the method 400 includes, detecting, based on the monitoring at block 410, the occurrence of at least one of a change in physical orientation of the computing device 100 and one or more changes in an ambient environment of the computing device 100. For instance, at block 420, the gyrometer 171 may detect a change in physical orientation of the computing device 100 between a vertical orientation and a horizontal orientation, or between a horizontal orientation and a vertical orientation. Additionally, at block 420, the accelerometer 172, the light sensor 173, the temperature sensor 174 and the location sensor 175 may detect other events (e.g., changes in an ambient environment of the computing device 100), such as those described herein.

At block 430, the method 400 includes, in response to the detecting at block 420, activating the controller 127 (or the processor 105) (hereafter "controller 127"). In embodiments of the method 400 where the computing device 100 is operating in the suspended power state at block 410, the controller 127 may already be active, and the operation of block 430 may be omitted. At block 440, the method 400 includes, providing information and/or data from the sensors 170 to the controller 127, where the information and/or data corresponds with the at least one of the change in physical orientation and the one or more changes in the ambient environment detected at block 420.

At block 450, the method 400 includes the controller 127 selecting, based on the information and/or data provided by the sensors 170 at block 440, a power state for the computing device 100, such as using the techniques described herein. As discussed above, the selected power state may be the hibernation power state, the suspended power state or an active power state. The selection at block 450 may be further based on other information, such as information included in the activity monitor 147, information from the RTC 110 and/or an amount of remaining battery capacity of a battery included in the computing device 100. In other embodiments, the selection at block 450 may be based on other information. At block 460, the method 400 includes transitioning the computing device 100 to the selected power state, which may be initiated by the controller 127 or, in certain embodiments, may be initiated by the timer 115.

Figure 5:
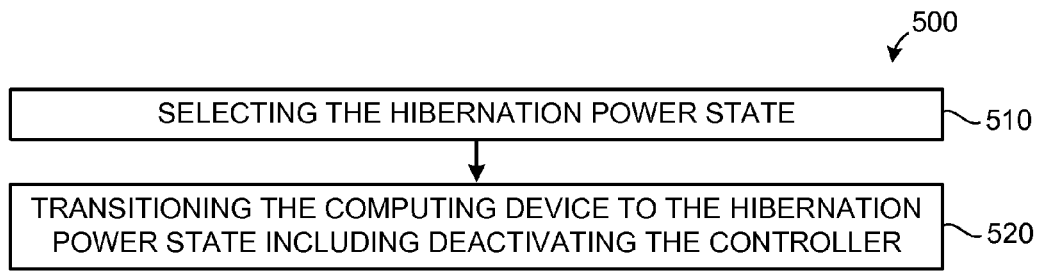
FIG. 5 is a flowchart illustrating a method of transitioning to a hibernation power state in accordance with an example embodiment.

FIG. 5 is a flowchart illustrating a method 500 of transitioning to a hibernation power state in accordance with an example embodiment. The method 500 may be implemented in conjunction with the method 400, such as at block 460, if the hibernation power state is selected at block 450 (as in block 510). As with the method 400, the method 500 may be implemented in the computing system 100 shown in FIG. 1. Accordingly, for purposes of illustration, the method 500 will be described with further reference to FIG. 1. It will be appreciated, however, that the method 500 may be implemented in computing devices having a number of other configurations.

At block 510, the method 500 includes selecting the hibernation power state (such as at block 450 of the method 400). At block 520, the method 500 includes transitioning the computing device 100 to the hibernation power state, including deactivating the controller. If the computing device 100 is operating, e.g., at block 410, in the suspended power state, transitioning the computing device 100 to the hibernation power state at block 520 may include copying operating state information of the computing device 100 from volatile memory to non-volatile memory, such as previously described.

Figure 6:
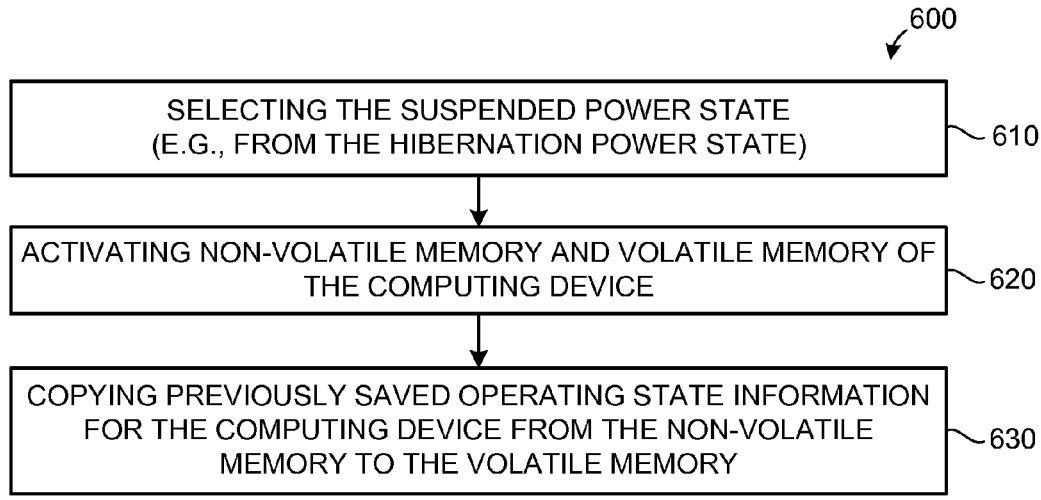
FIG. 6 is a flowchart illustrating a method of transitioning to a suspended power state in accordance with an example embodiment.

FIG. 6 is a flowchart illustrating a method 600 of transitioning to a suspended power state in accordance with an example embodiment. As with the method 500, the method 600 may be implemented in conjunction with the method 400, such as at block 460, if the suspended power state is selected at block 450 (as in block 610). As with the methods 400 and 500, the method 600 may be implemented in the computing system 100 shown in FIG. 1. Accordingly, for purposes of illustration, the method 600 will be described with further reference to FIG. 1. It will be appreciated, however, that the method 600 may be implemented in computing devices having a number of other configurations.

At block 610, when implemented in the computing device 100, the method 600 includes selecting the suspended power state (such as at block 450 of the method 400), e.g., when the computing device 100 is operating in the hibernation power state at block 410. At block 620, the method includes activating non-volatile memory and volatile of the computing device 100. At block 630, the method 600 includes transitioning the computing device 100 to the active power state, including copying previously saved operating state information from the non-volatile memory to the volatile memory of the computing device 100.

Figure 7:
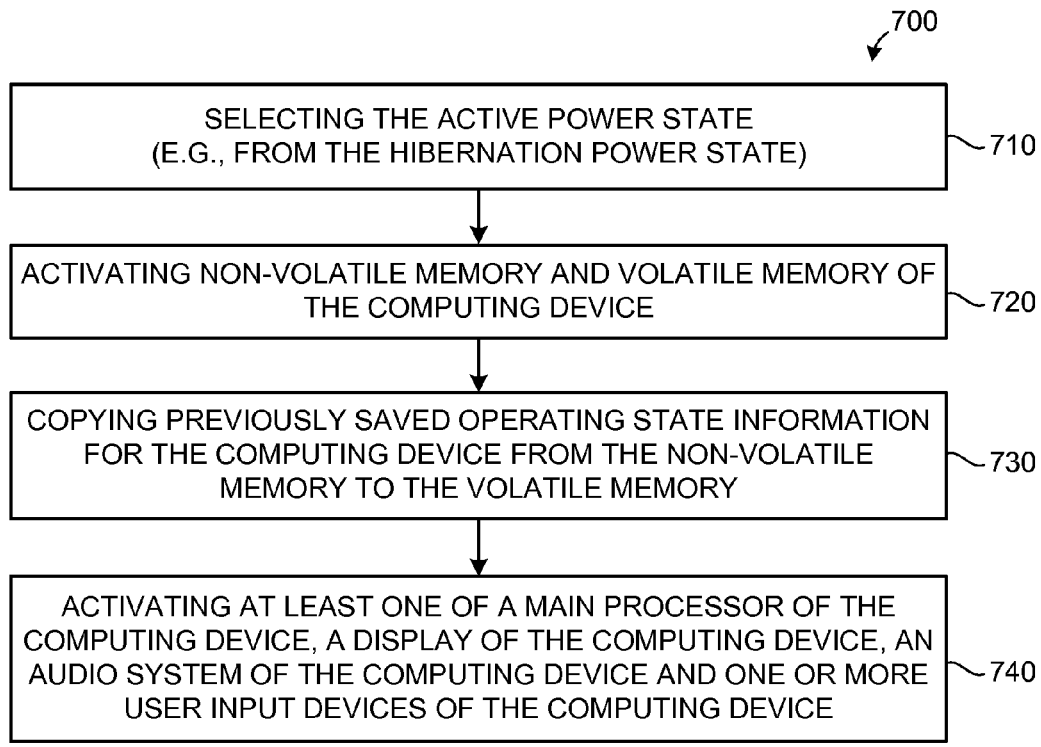
FIG. 7 is a flowchart illustrating a method of transitioning to an active power state in accordance with an example embodiment.

FIG. 7 is a flowchart illustrating a method 700 of transitioning to an active power state in accordance with an example embodiment. As with the methods 500 and 600, the method 700 may be implemented in conjunction with the method 400, such as at block 460, if the active power state is selected at block 450 (as in block 710). As with the methods 400, 500 and 600, the method 700 may be implemented in the computing system 100 shown in FIG. 1. Accordingly, for purposes of illustration, the method 700 will be described with further reference to FIG. 1. It will be appreciated, however, that the method 700 may be implemented in computing devices having a number of other configurations.

At block 710, when implemented in the computing device 100, the method 700 includes selecting the active power state (such as at block 450 of the method 400), e.g., when the computing device 100 is operating in the hibernation power state at block 410. At block 720, the method includes activating non-volatile memory and volatile of the computing device 100. At block 730, the method 700 includes transitioning the computing device 100 to the active power state, including copying previously saved operating state information from the non-volatile memory to the volatile memory of the computing device 100. At block 740, the method 700 includes activating at least one of the processor 105, the display device 160, the audio system 120 and the user input devices 150 of the computing device 100.

Figure 8:
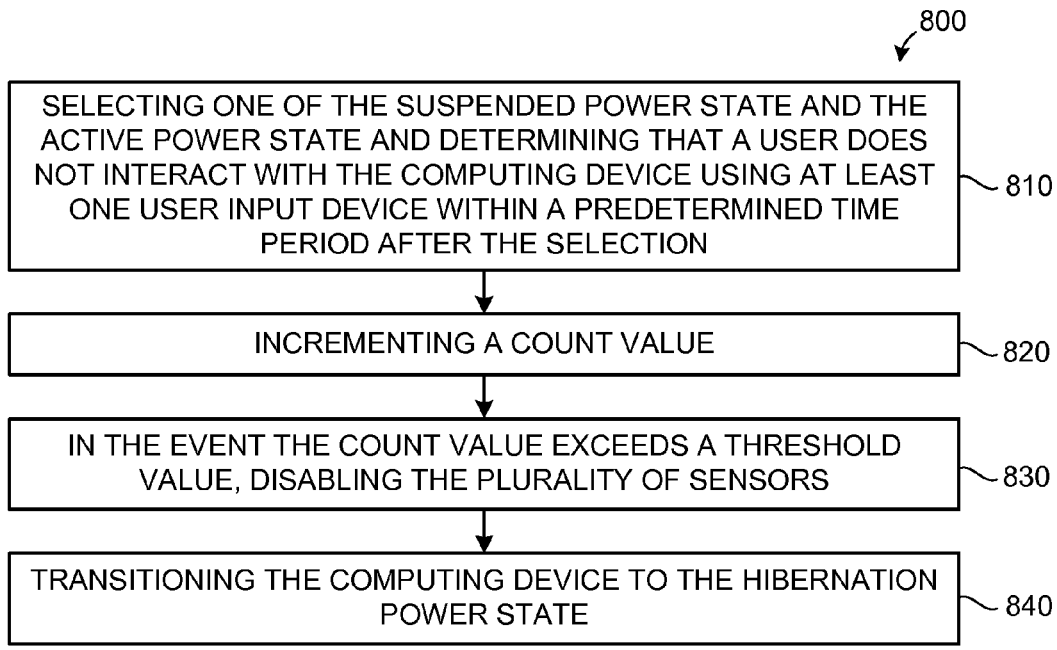
FIG. 8 is a flowchart illustrating a method of transitioning power states in accordance with an example embodiment.

FIG. 8 is a flowchart illustrating a method 800 of transitioning power states in accordance with an example embodiment. The method 800 may be implemented in conjunction with the method 900 shown in FIG. 9 to handle the occurrence of false positives, such as were previously described. As with the methods 500, 600 and 700, the method 800 may be implemented in conjunction with the method 400. As with the methods 400, 500, 600 and 700, the method 800 may be implemented in the computing system 100 shown in FIG. 1. Accordingly, for purposes of illustration, the method 800 will be described with further reference to FIG. 1. It will be appreciated, however, that the method 800 may be implemented in computing devices having a number of other configurations.

The method 800, when implemented in the computing device 100, includes, at block 810, selecting one of the suspended power state and the active power state when the computing device 100 is operating in the hibernation power state (such as at block 410 of the method 400). The method 800 further includes, at block 810, determining that a user does not interact with the computing device 100 (e.g., via the user input devices 150) within a predetermined period of time (e.g., five minutes in an example embodiment). The method 800 then includes, at block 820, incrementing a false positive count value in the counter(s) 140. At block 830, in the event the false positive count value exceeds a false positive threshold (e.g., five in an example embodiment), the method 800 includes disabling the plurality of sensors 170 in order to prevent the occurrence of additional false positives in order to conserve power that would be consumed as a result of associated power state transitions. At block 840, the method 800 still further includes transitioning the computing device to the hibernation state, including copying operating state information to non-volatile memory, as appropriate in the particular instance.

Figure 9:
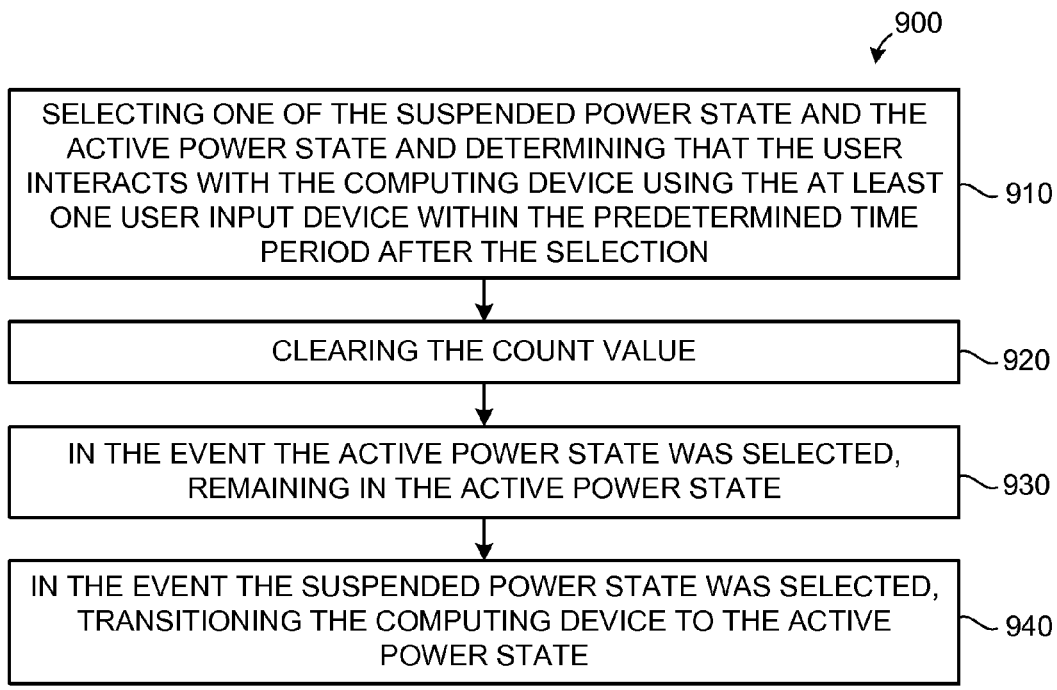
FIG. 9 is a flowchart illustrating another method of transitioning power states in accordance with an example embodiment.

FIG. 9 is a flowchart illustrating another method 900 of transitioning power states in accordance with an example embodiment. As noted above, the method 900 may be implemented in conjunction with the method 800 shown in FIG. 8 to handle the occurrence of false positives, such as were previously described. As with the methods 500, 600, 700 and 800, the method 900 may be implemented in conjunction with the method 400. As with the methods 400, 500, 600, 700 and 800, the method 900 may be implemented in the computing system 100 shown in FIG. 1. Accordingly, for purposes of illustration, the method 900 will be described with further reference to FIG. 1. It will be appreciated, however, that the method 900 may be implemented in computing devices having a number of other configurations.

The method 900, when implemented in the computing device 100, includes, at block 910, selecting one of the suspended power state and the active power state when the computing device 100 is operating in the hibernation power state (such as at block 410 of the method 400). The method 900 further includes, at block 910, determining that a user interacts with the computing device 100 (e.g., via the user input devices 150) within a predetermined period of time, such as the predetermined period of time of block 810. In an example embodiment, in addition to interacting with the computing device using the user input devices 150, the user may interact with the computing device in other manners, such as by opening a display panel of the computing device 100. The method 900 then includes, at block 920, clearing a false positive count value in the counter(s) 140, such as the false positive count value of block 820. At block 930, in the event the active power state was selected at block 910, the method 900 includes remaining in the active power state. At block 940, in the event the suspended power state was selected at block 910, the method 900 includes transitioning the computing device 100 from the suspended power state to the active power state, such as in the manners described herein.

Figure 10:
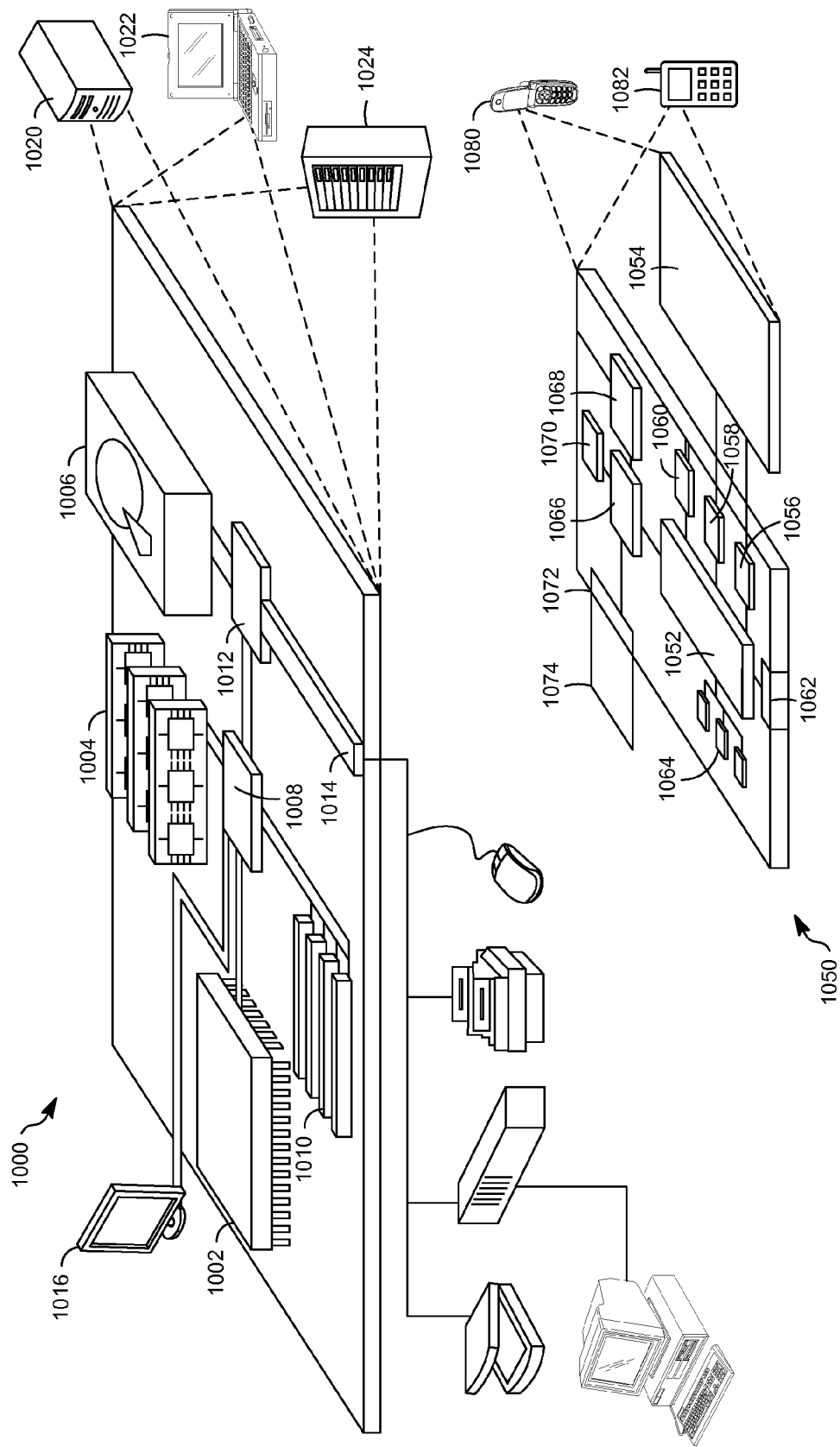
FIG. 10 is a diagram that illustrates a computing device and a mobile computing device that can be used to implement the techniques described herein in accordance with an example embodiment.

FIG. 10 is a diagram that shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1084 may also be provided and connected to device 1050 through expansion interface 1082, which may include, for example, a SIMM (Single In Line Memory Module) card interface. Such expansion memory 1084 may provide extra storage space for device 1050, or may also store applications or other information for device 1050. Specifically, expansion memory 1084 may include instructions to carry out or supplement the processes described above, and may include secure information also. Thus, for example, expansion memory 1084 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1084, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1080 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   monitoring, by a computing device, a plurality of sensors included in the computing device;
   providing, by the plurality of sensors and to a controller included in the computing device, information regarding occurrences of events detected by the plurality of sensors;
   generating, by the controller, a heuristic-based usage pattern based on the information regarding the occurrences of events detected by the plurality of sensors;
   monitoring, by the computing device operating in a first power state, the plurality of sensors included in the computing device;
   detecting, based on the monitoring, an occurrence of at least one of a change in physical orientation of the computing device and one or more changes in an ambient environment of the computing device;
   providing, from the plurality of sensors to the controller, data corresponding with the at least one of the change in physical orientation of the computing device and the one or more changes in the ambient environment of the computing device; and
   selecting, by the controller, a second power state for the computing device different from the first power state, the selection based on the data provided by the plurality of sensors and on the heuristic-based usage pattern.

2. The method of claim 1,
   wherein the plurality of sensors include at least two of a gyrometer, an accelerometer, a light sensor, a temperature sensor and a location sensor, and
   wherein providing, by the plurality of sensors and to a controller included in the computing device, information regarding occurrences of events detected by the plurality of sensors is independent of a power state of the computing device.

3. The method of claim 1, wherein detecting the change in physical orientation of the computing device comprises detecting one of a change of orientation of the computing device from a vertical orientation to a horizontal orientation, or a change of orientation of the computing device from the horizontal orientation to the vertical orientation.

4. The method of claim 1, wherein detecting one or more changes in the ambient environment of the computing device comprises detecting one or more of:
   a change in ambient light;
   a change in ambient temperature;
   a change in vibrations occurring in the ambient environment; and
   a change in geographic location of the computing device.

5. The method of claim 1,
   wherein the plurality of sensors include a light sensor, and
   wherein providing, by the plurality of sensors and to a controller included in the computing device, information regarding occurrences of events detected by the plurality of sensors includes providing, by the light sensor, information regarding a detected rate of change in light intensity if the detected rate of change in light intensity is above a threshold rate of change.

6. The method of claim 1,
   wherein the plurality of sensors include a temperature sensor, and
   wherein providing, by the plurality of sensors and to a controller included in the computing device, information regarding occurrences of events detected by the plurality of sensors includes providing, by the temperature sensor, information regarding a detected rate of change in temperature if the detected rate of change in temperature is above a threshold rate of change.

7. The method of claim 1, wherein selecting, by the controller, a second power state for the computing device different from the first power state, is further based on an amount of remaining capacity of a battery included in the computing device.

8. The method of claim 1, wherein the second power state is a lower power state than the first power state.

9. The method of claim 1, wherein the first power state is a lower power state than the second power state.

10. A computing device comprising:
    a plurality of sensors configured to detect occurrences of events; and
    a controller that is operably coupled with the plurality of sensors, the controller being configured to:
      receive, from the plurality of sensors, information regarding the occurrences of the events detected by the plurality of sensors;
      generate a heuristic-based usage pattern based on the information;
      receive, from the plurality of sensors and while the computing device is in a first power state, data corresponding with an occurrence of at least one of a change in physical orientation of the computing device and one or more changes in an ambient environment of the computing device; and
      select a second power state for the computing device different from the first power state, the selection based on the data received from the plurality of sensors and on the heuristic-based usage pattern.

11. The computing device of claim 10,
    wherein the plurality of sensors include at least two of a gyrometer, an accelerometer, a light sensor, a temperature sensor and a location sensor, and
    wherein receiving, from the plurality of sensors, information regarding the occurrences of the events detected by the plurality of sensors is independent of a power state of the computing device.

12. The computing device of claim 10,
    wherein the computing device further comprises a battery, and wherein selecting a second power state for the computing device different from the first power state, is further based on an amount of remaining capacity of the battery.

13. The computing device of claim 10, wherein the second power state is a lower power state than the first power state.

14. The computing device of claim 10, wherein the first power state is a lower power state than the second power state.

15. A non-transitory, machine-readable medium having instructions stored thereon, the instructions, when executed by a processor, cause a computing device to:
- receive information regarding occurrences of events detected by a plurality of sensors;
- generate a heuristic-based usage pattern based on the information regarding the occurrences of events detected by the plurality of sensors;
- monitor, while operating in a first power state, the plurality of sensors;
- detect, based on the monitoring, an occurrence of at least one of a change in physical orientation of the computing device and one or more changes in an ambient environment of the computing device;
- receive data corresponding with the detected occurrence of the at least one of the change in physical orientation of the computing device and the one or more changes in the ambient environment of the computing device; and
- select a second power state different from the first power state for the operation of the computing device, the selection being based on the received data.

16. The medium of claim 15,
- wherein the plurality of sensors include at least two of a gyrometer, an accelerometer, a light sensor, a temperature sensor and a location sensor, and
- wherein receiving information regarding occurrences of events detected by the plurality of sensors is independent of a power state of the computing device.

17. The medium of claim 15, wherein the instructions that cause the computing device to detect the change in physical orientation of the computing device include instructions to detect one of a change of orientation of the computing device from a vertical orientation to a horizontal orientation, or a change of orientation of the computing device from the horizontal orientation to the vertical orientation.

18. The medium of claim 15, wherein the instructions that cause the computing device to detect one or more changes in the ambient environment of the computing device include instructions to detect one of:
- a change in ambient light;
- a change in ambient temperature;
- a change in vibrations occurring in the ambient environment; and
- a change in geographic location of the computing device.

19. The medium of claim 15,
- wherein the plurality of sensors include a light sensor, and
- wherein the instructions that cause the computing device to receive information regarding occurrences of events detected by the plurality of sensors include instructions that cause the computing device to receive, from the light sensor, information regarding a detected rate of change in light intensity if the detected rate of change in light intensity is above a threshold rate of change.

20. The medium of claim 15,
- wherein the plurality of sensors includes a temperature sensor, and
- wherein the instructions that cause the computing device to receive information regarding occurrences of events detected by the plurality of sensors include instructions that cause the computing device to receive, from the temperature sensor, information regarding a detected rate of change in temperature if the detected rate of change in temperature is above a threshold rate of change.

* * * * *